Jan. 18, 1966  J. B. KUCERA  3,229,828
MATERIAL HANDLING APPARATUS
Filed Oct. 9, 1963  8 Sheets-Sheet 1

INVENTOR
JOSEPH B. KUCERA
BY
ATTORNEY

Jan. 18, 1966      J. B. KUCERA      3,229,828
MATERIAL HANDLING APPARATUS
Filed Oct. 9, 1963      8 Sheets-Sheet 2
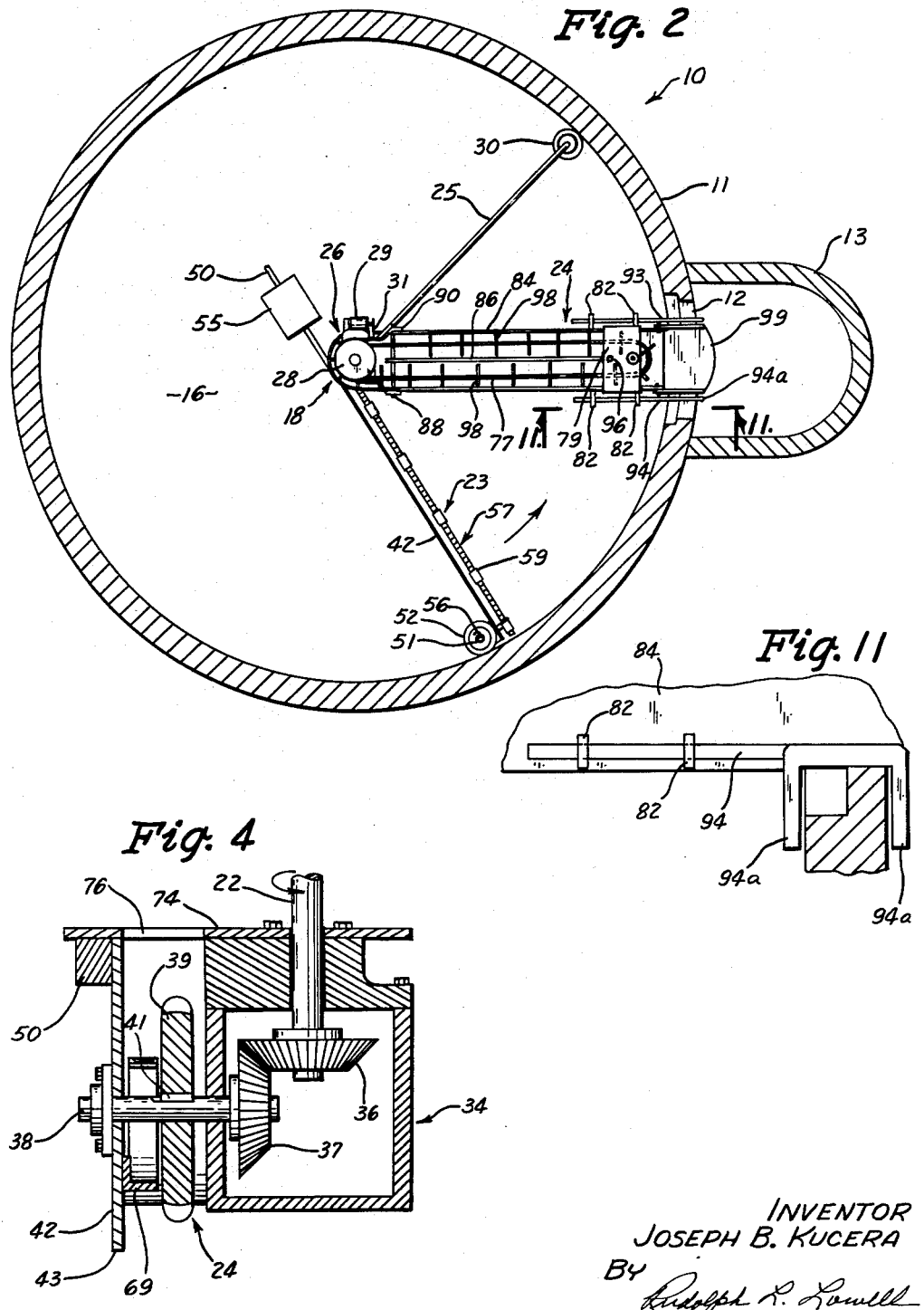
INVENTOR
JOSEPH B. KUCERA
BY
Rudolph L. Lowell
ATTORNEY

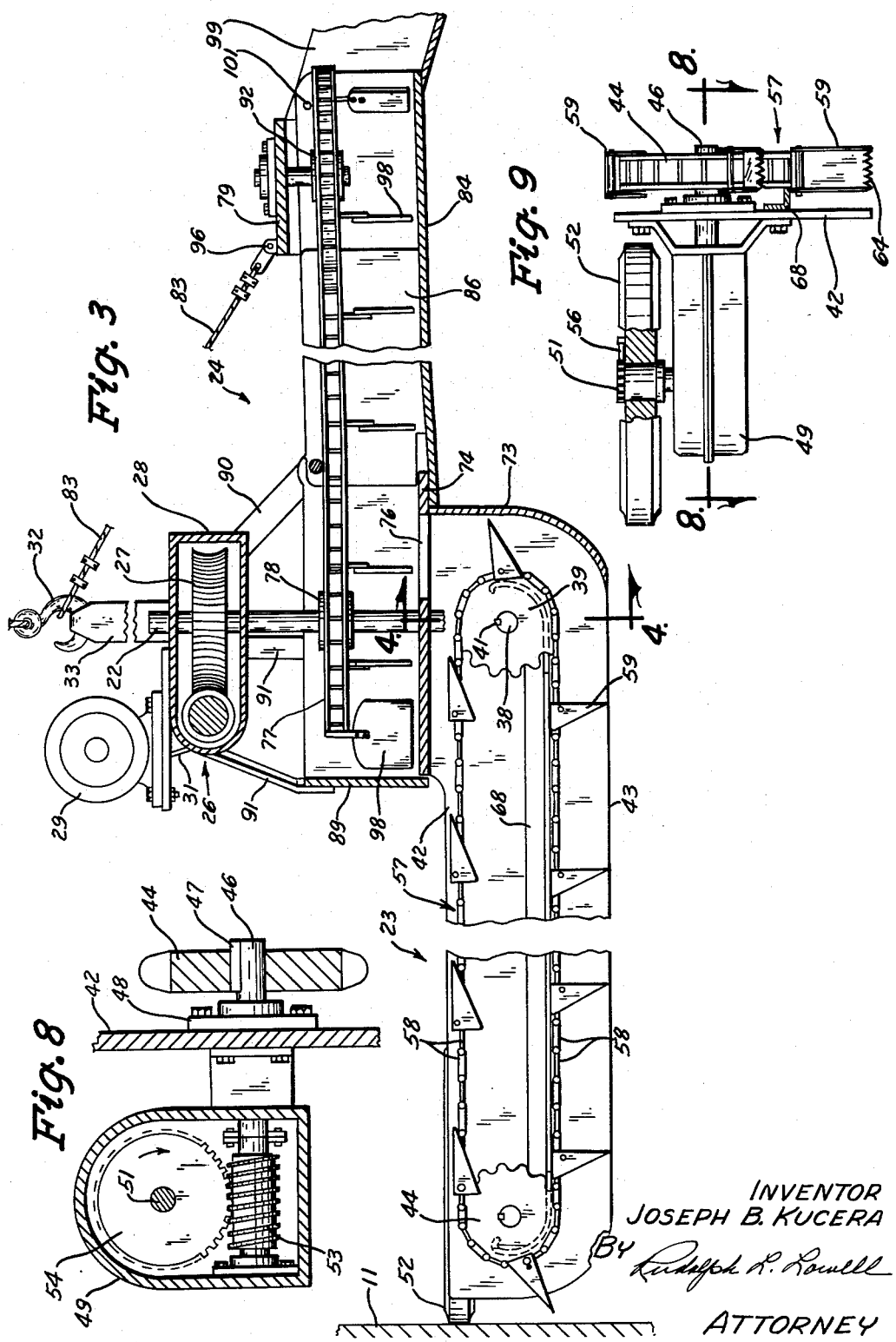

Jan. 18, 1966   J. B. KUCERA   3,229,828
MATERIAL HANDLING APPARATUS
Filed Oct. 9, 1963   8 Sheets-Sheet 4
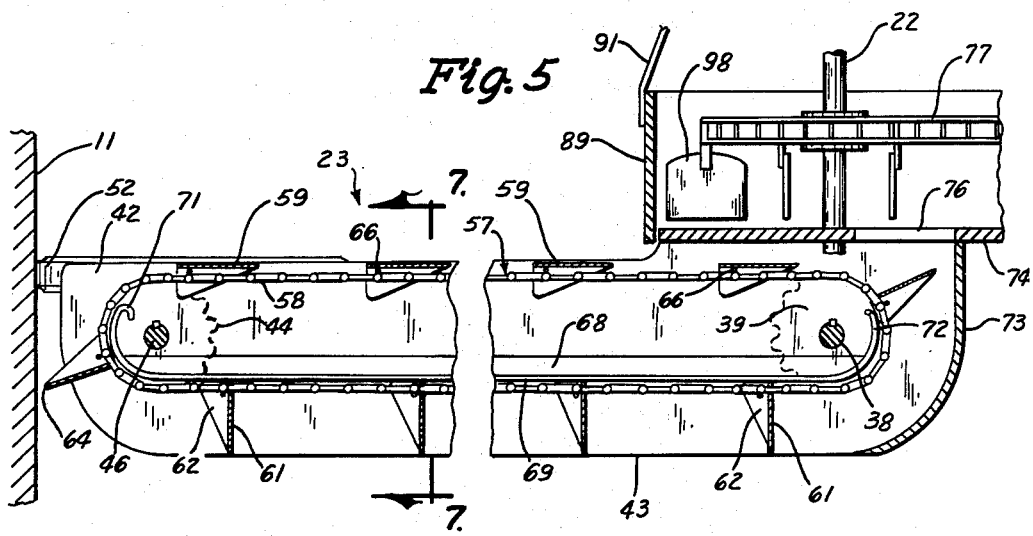
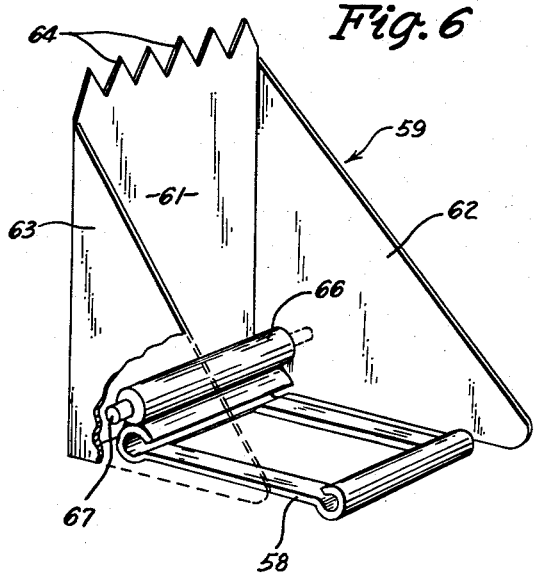
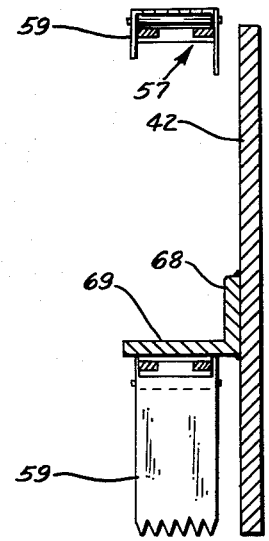
INVENTOR
JOSEPH B. KUCERA
BY
ATTORNEY

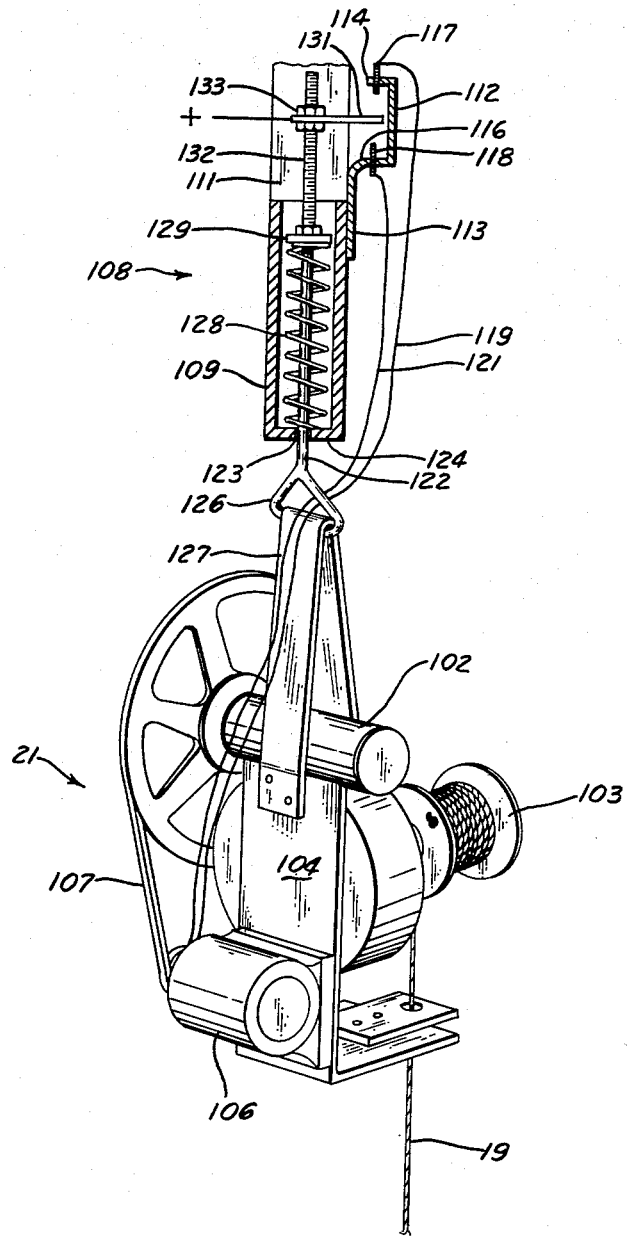

Jan. 18, 1966  J. B. KUCERA  3,229,828
MATERIAL HANDLING APPARATUS
Filed Oct. 9, 1963  8 Sheets-Sheet 6
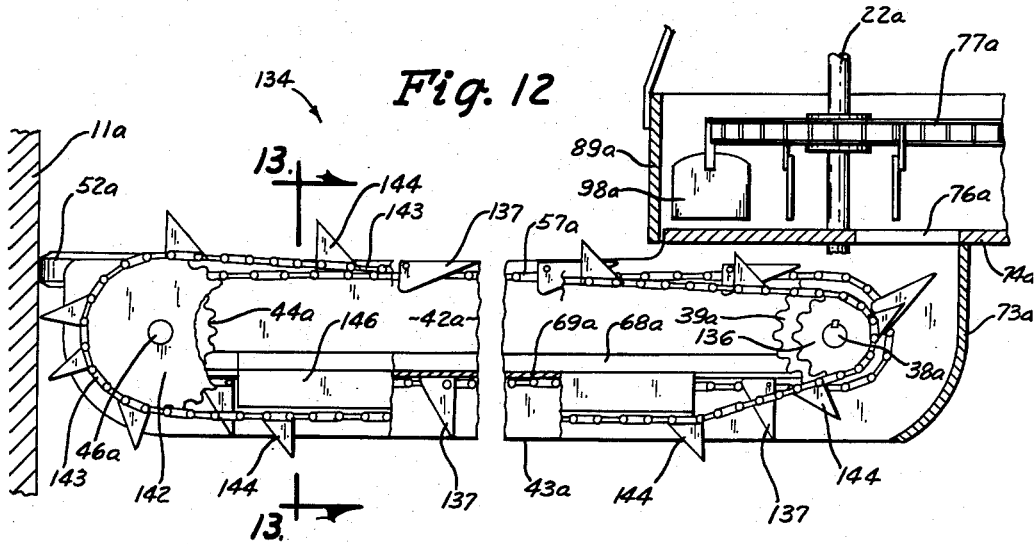
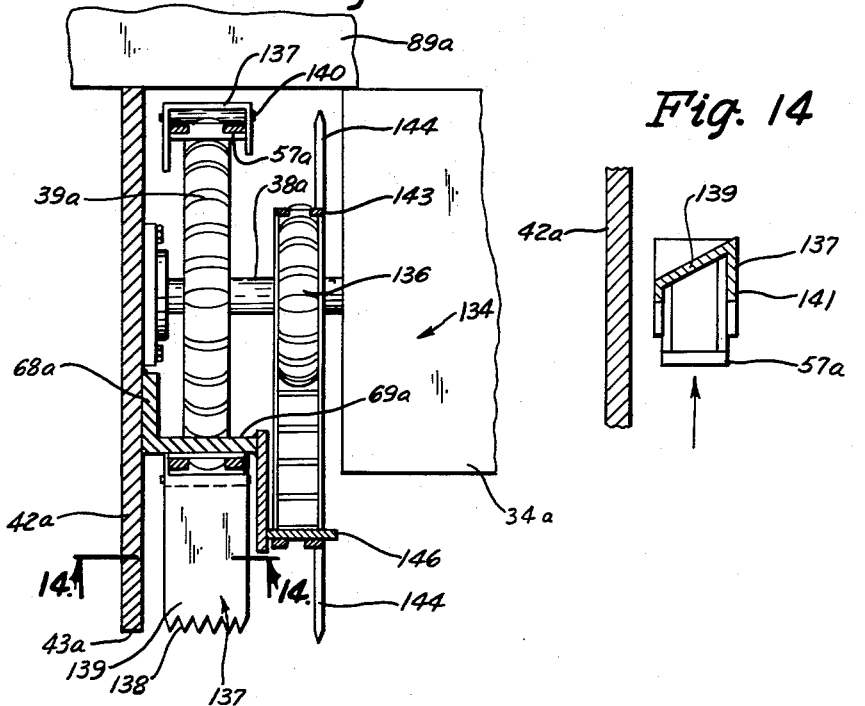
INVENTOR
JOSEPH B. KUCERA
BY
*Rudolph L. Lowell*
ATTORNEY

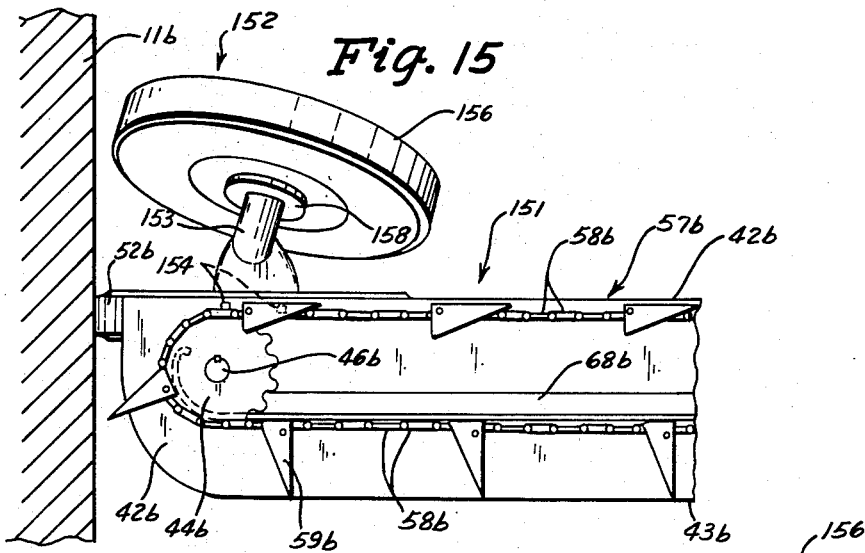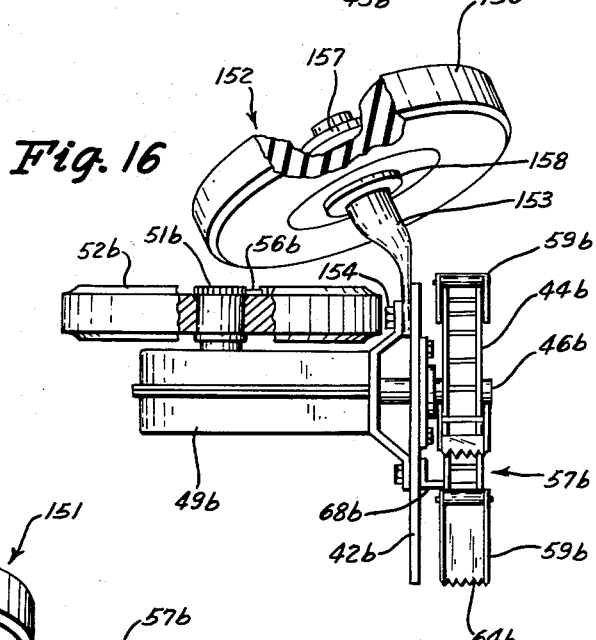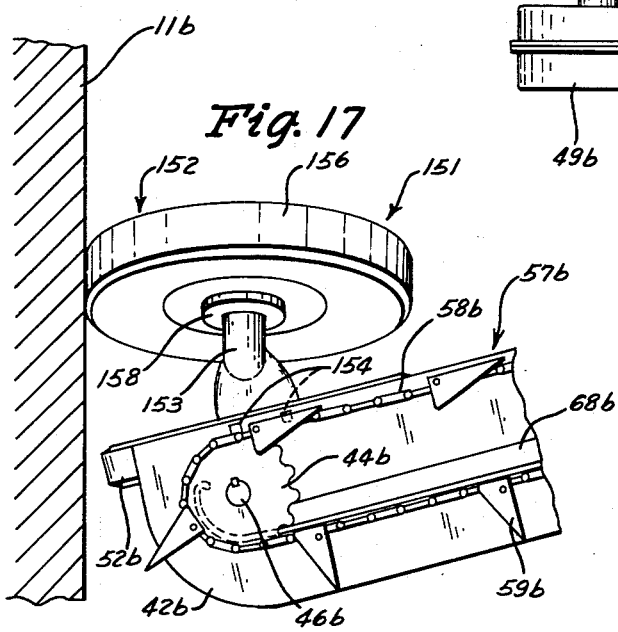

Jan. 18, 1966          J. B. KUCERA          3,229,828
             MATERIAL HANDLING APPARATUS
Filed Oct. 9, 1963                    8 Sheets-Sheet 8
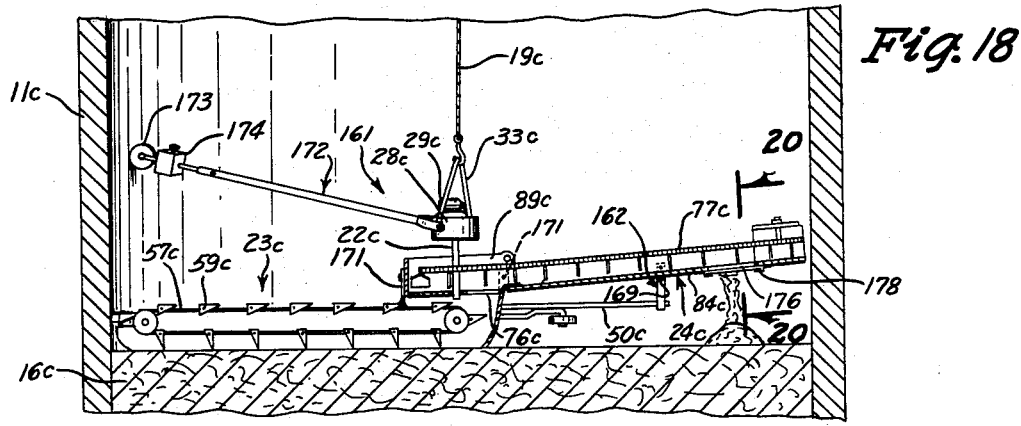
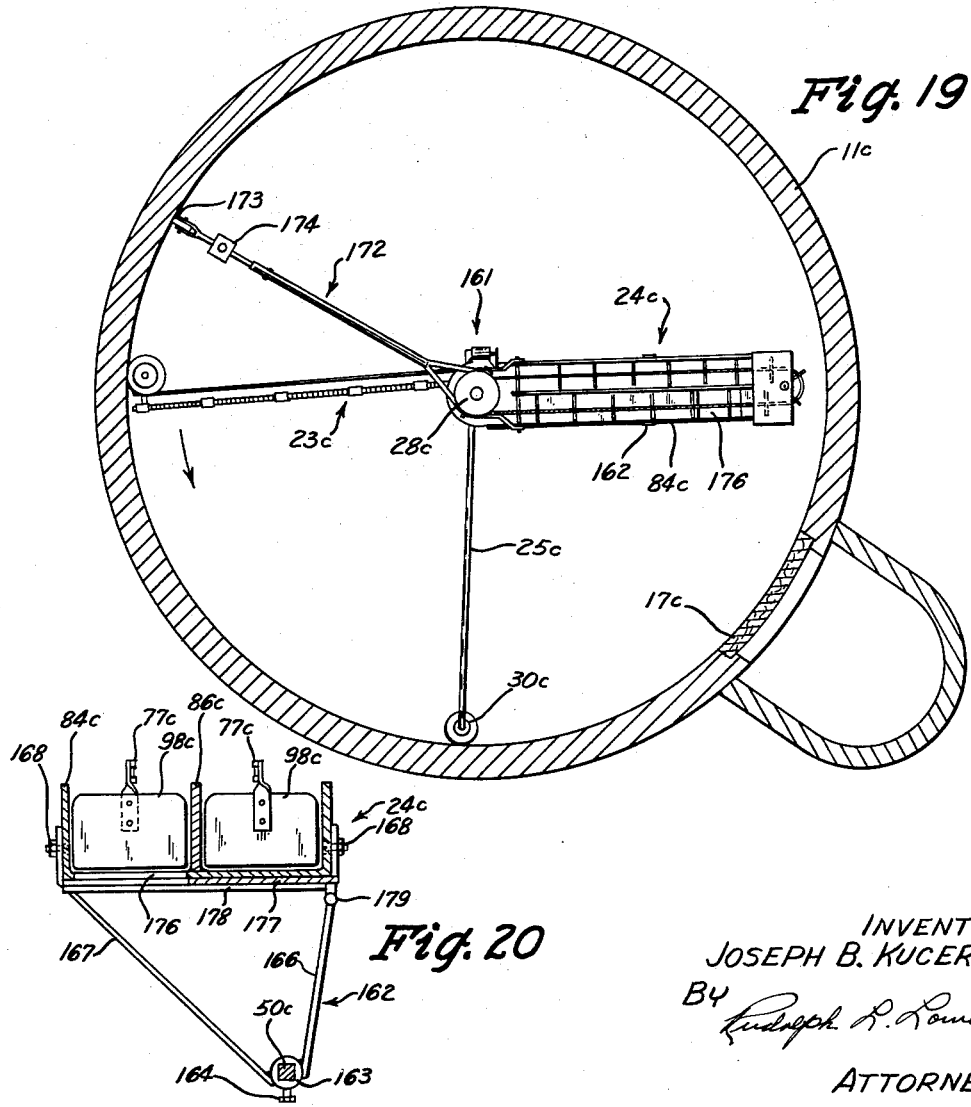
INVENTOR
JOSEPH B. KUCERA
BY
ATTORNEY

United States Patent Office 3,229,828
Patented Jan. 18, 1966

3,229,828
MATERIAL HANDLING APPARATUS
Joseph B. Kucera, Traer, Iowa, assignor of fifty percent to Rudolph L. Lowell, Des Moines, Iowa
Filed Oct. 9, 1963, Ser. No. 315,020
5 Claims. (Cl. 214—17)

This invention relates to a material gathering and conveying apparatus and more particularly to a silo unloader which operates to remove silage stored in a silo.

It is the object of the invention to provide an improved automatic silo unloader which has a rotary silage gathering means engaging the top layer of silage and operative to continuously dig into the silage and deliver silage toward the center of the silo, and lateral conveying means for receiving silage from the gathering means and carrying silage from the center area of the silo to a silo discharge chute.

Another object of the invention is to provide in a silo unloader a single rotary silage gathering means which removes and feeds silage from the silo walls and from the top surface of stored silage toward the center of the silo, and then elevates the silage thus removed to a lateral discharge conveyer.

A further object of the invention is to provide a silo unloader with a radially extended silage gathering means which engages the silo wall and rotates about a vertical axis within the silo.

Another object of the invention is to provide a silo unloader which has low power requirements and is constructed from a minimum number of moving parts.

A further object of the invention is to provide a silo unloader which can be quickly converted to assist in the filling of a silo by evenly distributing the forage to all parts of the silo.

Still another object of the invention is to provide in combination with a silo unloader, an automatic control means for raising or lowering the silo unloader in accordance with level of the silage in the silo.

A further object is to provide a wheel assembly for a silo unloader operable to automatically maintain the silo unloader in a substantially level position.

An additional object of the invention is to provide a reliable and economical silo unloader which is sturdy in construction and readily accessible for repair and servicing.

Other objects and advantages of the apparatus embodying the invention will be apparent from the following detailed description taken in conjunction with the drawings in which:

FIG. 2 is a plan view of the silage unloader of FIG. 1;

FIG. 3 is an enlarged detail sectional view of the silage gathering and discharge conveying means of the unloader of FIG. 1;

FIG. 4 is an enlarged sectional view taken along the line 4—4 of FIG. 3;

FIG. 5 is an enlarged detail sectional view of the silage gathering conveyer means;

FIG. 6 is a perspective view of a link and arm assembly of the silage gathering conveyer means of FIG. 5;

FIG. 7 is an enlarged sectional view taken along the line 7—7 of FIG. 5;

FIG. 8 is an enlarged sectional view taken along the line 8—8 of FIG. 9;

FIG. 9 is an elevation view of the outer end of the silage gathering conveyer means;

FIG. 10 is an enlarged perspective view of the winch assembly of FIG. 1;

FIG. 11 is an enlarged sectional view taken along the line 11—11 of FIG. 2;

FIG. 12 is a view similar to FIG. 5 of a modified silage gathering conveyer means;

FIG. 13 is a sectional view taken along the line 13—13 of FIG. 11;

FIG. 14 is a sectional view taken along the line 14—14 of FIG. 12;

FIG. 15 is a side view of the outer end section of a modified silage gathering conveyer in a level position;

FIG. 16 is an end view of the gathering conveyer of FIG. 15;

FIG. 17 is a view similar to FIG. 15 showing the silage gathering conveyer below the level position;

FIG. 18 is a fragmentary vertical sectional view of a silo showing, in side elevation, a modification of the silage unloader of FIG. 1 equipped to level and distribute silage during the filling of the silo;

FIG. 19 is a plan view of FIG. 18; and

FIG. 20 is an enlarged sectional view taken along the line 20—20 of FIG. 18.

Figure 1:
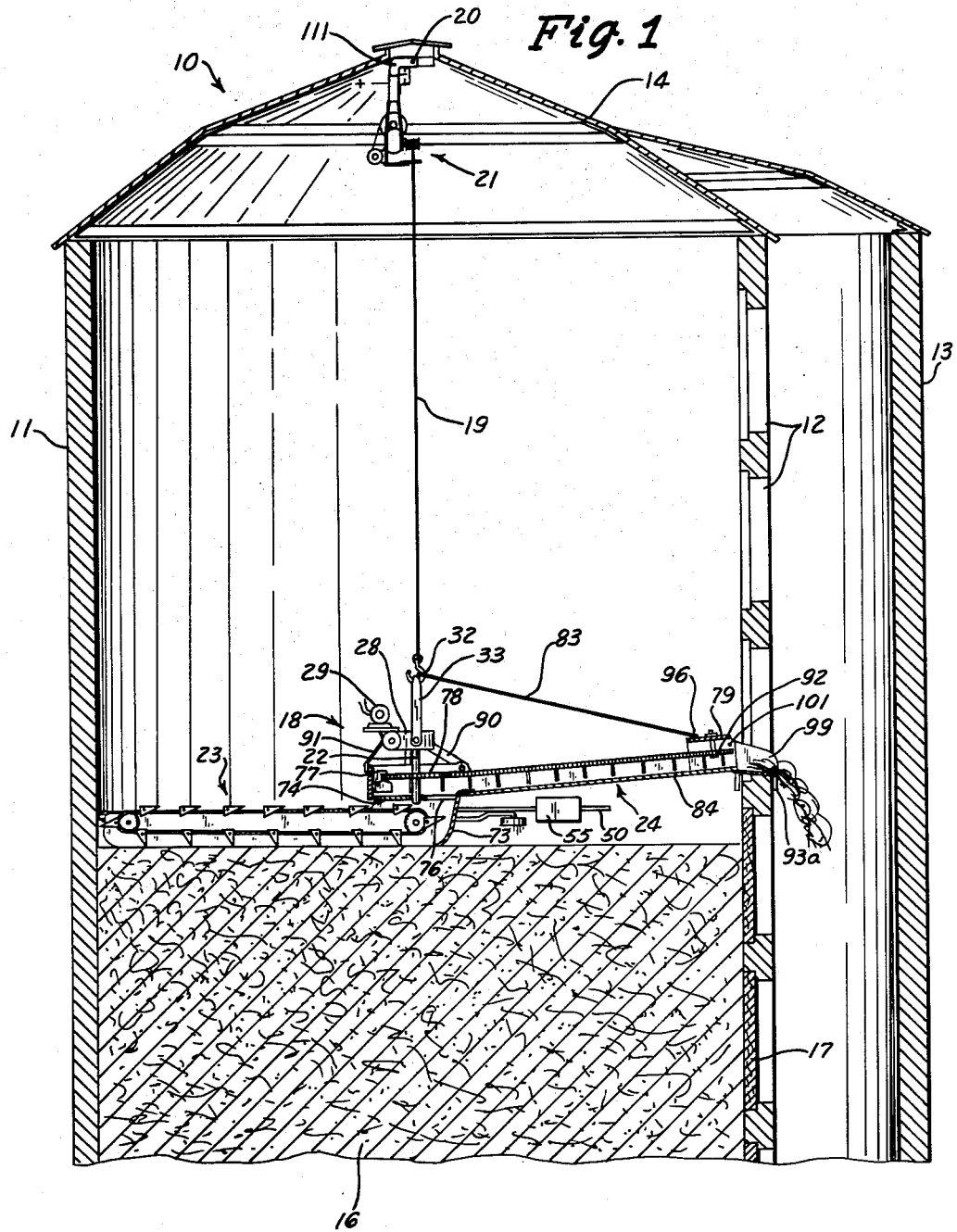
FIG. 1 is a vertical sectional view of a silo showing, in side elevation, the silage unloader of the invention in operative relation with the silage stored in the silo.

Referring to the drawing, there is shown in FIG. 1 an upright cylindrical silo 10 having a circular side wall 11 with a discharge opening section 12. The silo 10 is illustrated as partially filled with silage 16 such as cut grasses or corn. An upright chute 13 is fastened to the outside of the silo side wall 11 in alignment with the discharge opening section 12. A roof 14 attached to the top of the side wall 11 encloses the silo. In order to complete the peripheral side wall 11 of the silo, removable doors 17 are positioned in the discharge opening section 12. As the level of the silage is lowered the doors 17 are removed from the opening section 12 above the surface of the silage thereby providing a passageway through which the silage may be discharged into the chute 13.

Silage 16 is removed from the silo 10 by an automatic silage unloader 18 which is pendently suspended from the roof 14 of the silo by means of a cable 19. A winch assembly 21 connects the cable 19 to a pivot pin 20 secured to the central section of the roof 14. The vertical position of the silage unloader 18 with respect to the top surface of the silage 16 is automatically controlled by the winch assembly 19. The operation of the winch assembly 19 will be subsequently described in detail.

The automatic silo unloader 18 comprising the present invention includes an upright drive shaft 22 which is supported above the silage 16 by the cable 19. A rotary collector 23 is drivably connected to the lower end of the drive shaft 22 and projects radially outwardly and downwardly terminating in close proximity with the side wall 11 of the silo. A lateral conveyer 24 is drivably connected to the drive shaft 22 and positioned above the inner end of the rotary collector 23. The lateral conveyer 24 extends from the center area of the silo to the discharge opening section 12. As shown in FIG. 2, a radially extended arm 25 is angularly spaced forwardly of the rotary collector 23. A stabilizing wheel 30 is mounted on the end section of the arm 35 for rotation about an upright axis. The wheel 30 engages the silo side wall 11 and functions to maintain the shaft 22 in the center area of the silo.

Rotation of the drive shaft 22 operates the rotary collector 23 to carry silage toward the center area of the silo end in an upward direction into the lateral conveyer 24. The rotary collector 23 and the power transmitting unit 34 connecting the drive shaft 22 with the rotary collector 23 produces a torque which moves or walks the rotary collector 23 around the side wall 11 thereby removing the entire top layer of silage. Since the rotary collector 23 has a downward inclination the top layer of silage has a cone shape which is maintained as the rotary collector 23 walks around the silo. The lateral conveyor 24 driven by the drive shaft 22 transports the silage through the discharge sections 12 into the chute 13.

As shown in FIG. 3, the drive shaft 22 is connected in a driving relation with a power means 26 which comprises a worm and worm gear drive 27 enclosed in a casing 28 and an electric motor 29 mounted on the casing 28. A belt 31 transmits power from the motor 29 to the worm of the drive 27.

The lower end of the cable 19 is provided with a hook 32 which extends through an inverted U-shaped strap 33 secured at its ends to the casing 28. The shaft 22 is held in an upright position by the casing 28 which is connected to the cable 19.

As shown in FIGS. 3 and 4, a power transmission mechanism 34 is mounted on the lower end of the drive shaft 22 and comprises a pair of bevel gears 36 and 37 rotatable in a driving relationship. The bevel gear 36 is secured to the shaft 22 and drives the bevel gear 37 which is mounted on a lateral shaft 38. The shaft 38 extends transversely of the shaft 22 and lies in a substantially horizontal plane. A chain sprocket 39 is mounted in a driving relation with the outer end of the shaft 38 by a key 41.

An arm member comprising a flat plate 42 is positioned in a vertical plane secured at its inner end to a horizontal plate 74. In the working or level position of the collector 23, the plate 42 is spaced from the transmission mechanism 34 and projects radially outward into close proximity to the side wall 11 and has a substantially straight lower edge 43 which is below the sprocket 39 and extends in a radial direction outwardly and downwardly into engagement with the surface of the silage 16. A bar 50 is secured to the plate 42 and extends radially outwardly from the inner end of the plate 42 above the top surface of the silage. In order to counter balance the collector 23 a weight 55 is mounted on the bar 50. The radial position of the weight 55 on the bar 50 may be adjusted to change the balance characteristics of the collector 23.

A sprocket 44 is rotatably mounted on the outer end section of the flat plate 42. The sprocket 44 rotates about a horizontal axis which extends substantially parallel to the axis of rotation of the drive sprocket 39. As shown in FIG. 8 the idler sprocket 44 is drivably mounted on the shaft 46 by means of a key 47. The shaft 46 projects through the plate 42 and is mounted thereon by a bearing 48. The shaft 46 extends into a worm and worm gear assembly 49 which drives an upwardly extended shaft 51. The worm 53 is coupled to the shaft 46 and is in engagement with a worm gear 54.

As shown in FIG. 9, a wheel 52, having a pneumatic or soft rubber tire, is mounted on the shaft 51. The wheel 52 engages the side wall 11 to maintain the rotary collector 23 a predetermined distance from the side wall. The wheel 52 is connected to the shaft 51 with a one-way drive ratchet mechanism 56, shown in FIGS. 2 and 9, which functions to limit the speed of rotation of the wheel 52 in accordance with the speed of rotation of the sprocket 44.

The one-way drive ratchet mechanism 56 permits the sprocket 44 to be freely rotated but limits the speed of rotation of the wheel 52 as the mechanism 56 drivably connects the wheel 52 with the shaft 51 when the speed of rotation of the wheel 52 and shaft 51 are equal.

As best shown in FIG. 3, an endless chain 57 is positioned about the sprockets 39 and 44. The chain 57 comprises a plurality of links 58 pivotally connected together. Pivotally mounted on the chain 57 about the circular extent thereof are tooth devices 59. Referring to FIG. 6, the tooth devices 59 have a base wall 61 and spaced triangular-shaped side flanges 62 and 63. The outer end of the base wall 61 has a plurality of cutting claws 64 which extend in an outward direction. In order to pivotally mount a tooth device 59 on a link 58 a tubular member 66 is secured to the one end of the link 58. A transverse pin 67 extends through the tubular member 66 and is anchored to the side flanges 62 and 63 of a tooth device 59. The pivotal movement of a tooth device 59 is controlled by the side flange 62 which functions as a crank arm with a tooth device 59 pivoting about the pin 67.

A roller chain may be substituted for the link chain 57. When a roller chain is used the tooth devices 59 are pivotally mounted on the transverse pins connecting the links of the chain.

As shown in FIG. 5, the chain 57 travels in an endless path in an upright plane which extends from substantially the center area of the silo to the side wall 11. The tooth devices 59 extend laterally so as to project beyond the lower edge 43 of the plate 42. The wheel 52 maintains the clearance between the tooth devices 59 and the side wall 11.

The angular position of the tooth devices 59 with respect to the links 58 of the chain is controlled by a track 68 secured to the side of the plate 42. The track 68 extends along the radial length of the plate 62 substantially parallel to the lower edge 43. Referring to FIGS. 5 and 7, the track 68 has a lateral flange 69 which is engaged by the side flanges 62 of the tooth devices 59 thereby holding the base wall 61 in a substantially upright position. The outside end 71 of the flange 69 is curved up about the shaft 46 so that a tooth device striking the outside end of the flange 71 will engage the silage adjacent the side wall 11 when it is in a substantially lateral position thereby forming the function of chipping the silage from the side wall. The inside end 72 of the flange 69 is curved upwardly about the shaft 38 and functions to maintain the tooth devices 59 in a lateral position so that the base wall of each of the tooth devices elevates the silage. As the tooth devices 59 move from the inside end 72 of the flange 69 they pivot about the pins 67 moving the base wall 61 in substantial parallel alignment with the links 58 of the chain. The chain 57 driven by the sprocket 39 has a cutting action on the silage and carries the silage toward the center area of the silo. The tooth devices 59 co-act with a curved housing 73 to guide the silage carried toward the center of the silo in an upward direction.

A horizontal circular plate 74 is secured to the transmission mechanism 34 and housing 73. The plate 74 has an opening 76 which forms a passage into the chamber formed by the housing 73 and the inside end section of the plate 42. The silage carried by the tooth devices 59 is forced in an upward direction through the opening 76 into the path of a chain conveyer 77.

The lateral conveyer 24 has a U-shaped conveyer pan 84 formed with a central longitudinal upright rib 86. The pan 84 is positioned below the chain conveyer 77 which extends around a drive sprocket 78 mounted on the drive shaft 22 below the casing 28. The inside end section of the conveyer pan 84 is pivotally mounted by means of a horizontal bolt 88 on a circular housing 89 which extends around the drive shaft 22 in the plane of the chain conveyer 77 and opens into the conveyer pan 84. A pair of downwardly and outwardly extended arms 90 secure the bolt 88 and the conveyer pan section of the housing 89 to the sides of the worm drive casing 28. The housing 89 is suspended also by strap members 91 from the worm drive casing 28. The bolt 88 engages the top of the chain conveyer 77 to keep the chain in alignment with the driven sprocket 78 thereby enabling the conveyer pan 84 to be tilted with respect to the housing 89.

An idler sprocket 92 rotatably is mounted on a transverse plate 79 by a bearing 81. The plate 79 extends over the top of and is secured to the outer end of the pan 84. In operation the chain conveyer 77 travels around the sprockets 78 and 92 in an endless path. The chain conveyer 77 has downwardly extended hands 98 which are connected to spaced links of the chain and are carried in a circular path over the plate 74 and the pan 84 to move the silage which is forced through the opening 76 by the tooth devices 59 of the collector 23. This material is moved from the center area of the silo over the pan 84 on to a spout 99 pivotally mounted on the end of the pan 84 by pin 101. The spout 99 extends through the opening section 12 to direct the silage into the chute 13.

The lateral conveyer 24 is held in alignment with the discharge opening section 12 by a pair of hook-shaped torque arms 93 and 94 which are slidably mounted on the sides of the pan 84 and extend over the sills of the doorway.

The arms 93 and 94 are substantially identical in construction. As shown in FIG. 11, the arm 94 is slidably mounted in a pair of collar members 82 secured to the side wall of the pan 84. The outer end of the arm 94 has downwardly extended fingers 94a which are positioned adjacent opposite sides of the sills of the doorway. The sliding connection between the arms 93 and 94 permit the lateral conveyor 24 to move in a radial direction as the level of the silage is lowered.

The winch assembly 21, shown in FIG. 10, comprises a worm gear unit 102 having a drum 103 adapted to receive the suspension cable 19. An angular plate 104 supports a reversible electric motor 106 and the worm gear unit 102. The electric motor 106 is coupled in a driving relation with the unit 102 by means of a belt 107. A control switch 108 connects the electric motor with a source of electric power. The control switch 108 is operative to energize the motor in opposite directions depending upon the load on the cable 19.

The control switch 108 comprises a cup-shaped housing 109 which is connected to the pin 20 on the roof 14 of the silo by an L-shaped strap 111 (FIG. 1). A U-shaped bracket 112 having a downwardly extended leg 113 is secured to one side of the housing 109. Each leg 114 and 116 of the U-shaped bracket 112 carries insulated electrical contacts 117 and 118, respectively. Conductors 119 and 121 connect the contacts 117 and 118 to the reversible electric motor 106. A rod 122 extends through a hole 123 in the bottom wall 124 of the cup-shaped housing 109. The rod 122 projects out of the housing 109 above the top wall thereof. The lower end of the rod 122 is shaped into a loop 126. The worm gear unit 102 is positively connected to the control switch 108 by a strap 127 which extends through the loop 126. A compression spring 128 is positioned within the housing 109 concentrically with the rod 122 which is connected to the housing 109 by a washer 129 that is threadably secured to the rod 122 and engages the top of the spring 128.

A laterally projected conductor element 131 connected to a source of electric power (not shown) is held on the upper threaded end 132 of the rod 122 between a pair of nuts 133. The position of the conductor element 131 with respect to the electrical contacts 117 and 118 may be adjusted by changing the relative vertical positions of the nuts 133. When the conductor element 131 engages the electrical contact 117 the motor 106 is connected to the source of electric power thereby operating the winch to increase the length of the suspension cable 19. When the weight on the cable 19 is increased the spring 128 will be compressed thereby moving the conductor element 131 out of engagement with electrical contact 117 and breaking the electrical circuit to the motor 106.

In operation, the silage unloader 18 is positioned in the silo 10 with the lateral conveyer 24 directed toward the discharge opening section 12. The arms 94 and 93 are moved into engagement with the sills of the openings 12 to maintain the aligned position of the lateral conveyer 24 with the opening section. A manual switch (not shown) positioned in the feed room connects the electric motor 29 to a source of electric power. The energized motor 26 operates the worm and worm gear drive 27 to rotate the drive shaft 22. The turning drive shaft 22 transmits power to the lateral conveyer 24 and the rotary collector 23.

As shown in FIG. 4 the shaft 22 extends into the power transmission mechanism 34 to drive the bevel gear 36 which in turn rotates the bevel gear 37 thereby driving the sprocket 39. The meshing bevel gears 36 and 37 provide the power transmission mechanism 34 with a torque which causes the rotary collector 23 to move or walk around the silo. The walking movement of the rotary collector 23 is supplemented by the driving action of the chain 57 and the associated tooth devices 59. The chain 57 being offset from the center of the silo produces a circumferential component of force which moves the rotary collector 23 around the silo in the direction of the arrow shown in FIG. 2.

As shown in FIGS. 3 and 5, the chain 57 moves in an endless path about the sprocket 39 and 44 adjacent the forward surface of the flat plate 42. The lower edge 43 of the flat plate 42 functions as a scraper blade and maintains the silage in the path of movement of the tooth devices 59. As the tooth devices 59 are carried toward the side wall of the silo 11 the side flange 62 engages the outside end 71 of the guide track 68 so as to pivot the tooth devices and maintain the base wall 61 in a lateral position with respect to the chain 57. The wheel 52 maintains a spaced relationship between the end of the tooth devices 59 and the side walls 11.

As shown in FIG. 5, as the tooth devices 59 pass over the idler sprocket 44 the cutting claws 64 of each device pass in close proximity to the side wall 11 removing the silage from the side wall. The tooth devices 59 are maintained in a lateral position during the movement thereof toward the center area of the silo. This is accomplished by the track 68 which has a flange 69 that is engaged by the side flange 62 of the respective tooth devices.

In the center area of the silo the tooth devices 59 move in an upward direction about the sprocket 39 into the curved housing 73. The inside end 72 of the flange 69 is curved in an upward direction and maintains the lateral position of the tooth devices which carry the silage in an upward direction forcing it through the hole 76 into the path of movement of the hands 98 of the lateral conveyer 24. When the side flanges 62 of the tooth devices 59 move from the inside end 72 of the flange 69 they pivot on the chain 57 whereby the base walls 61 are moved to positions extended substantially longitudinal of the chain 57.

As shown in FIGS. 1 and 2, the lateral conveyer 24 is held in alignment with the side wall opening 12 by the arms 93 and 94. The hands 98 carried by the endless chain 77 move the silage off of the plate 74 and up the conveyer pan 84 into the spout 99 which directs the silage into the silo chute 13.

As the silage 16 is removed from the silo the winch assembly 21 is automatically operated by the control switch 108 to lower the silo unloader 18 thereby keeping the rotary collector 23 in constant and uniform engagement with the top of the silage. This position is regulated by the compression characteristics of the spring 128 in the control switch 108.

As shown in FIG. 9, when the weight on the cable 19 is increased which is caused by the removal of the silage support from under the silo unloader, spring 128 will be compressed thereby moving the conductor element 131 into engagement with the electrical contact 118. The electric motor 106 is thereby connected to the source of electric power and operated to turn the worm gear assembly 102 for increasing the length of the cable 19 with the resultant lowering of the silo unloader 18.

When the silo unloader rests on top of the silage 16, the weight on the cable 19 is released thereby enabling the spring 128 to bias the conductor element 131 out of engagement with electrical contact 118 to break the electric circuit to the motor 106. This on and off operation of the winch assembly 21 is continuous to automatically lower the silo unloader 18. As the level of the silage 16 is lowered the livestock rancher periodically removes the doors 17 so that the spout 99 can be lowered into the silo openings 12.

A modified silage gathering conveyer 134 is shown in FIGS. 12, 13 and 14. The conveyer 134 is similar in construction to the rotary collector 23 of the silo unloader 18 illustrated in FIGS. 1, 2 and 3 and may be substituted therefor. The structure of the conveyer 134 which corresponds to structure of the rotary collector 23 is identified with the same reference number provided with a suffix $a$.

As shown in FIG. 12, the conveyer 134 has an upright plate member 42a extended in a radial direction terminating closely adjacent the silo wall 11a. The wheel 52a rotatably connected to the plate member 42a by the shaft 46a spaces the end of the plate member 42a from the silo wall 11a. The inner end of the plate member 42a is secured to the horizontal plate 74a and the power transmission mechanism 34a (FIG. 12).

The drive shaft 38a of the power transmission mechanism 34a extends laterally from the plate member 42a and has mounted thereon a first sprocket 39a and a smaller second sprocket 136. Rotation of the upright drive shaft 22a simultaneously operates the chain conveyer 77a and rotates the sprockets 39a and 136.

Referring to FIG. 12, a sprocket 44a is secured to a shaft 46a which is rotatably mounted on the outer end of the plate member 42a and extended laterally therefrom. An endless link chain 57a extends around the sprockets 39a and 44a and is driven by sprocket 39a in an endless path. The chain 57a rotates shaft 46a which in turn drives wheel 52a to limit the speed of rotation of the wheel 52a. Tooth devices 137 are pivoted on the chain at spaced intervals by pins 140.

As shown in FIG. 13, each tooth device 137 has a terminal edge formed with cutting claws 138 which extend downwardly below the lower edge 43a of the plate member 42a. The face 139 of each tooth device curves rearwardly toward the plate member 42a and functions as a mold board to move silage toward the plate member as it is carried radially to the center area of the silo (FIG. 14). This inclination of the face of a tooth device 137 increases the digging action of a tooth device and minimizes the up and down movement or chattering of a tooth device as it is moved over the silage.

A track 68a having a lateral flange 69a is secured to the side of the plate 42a and forms a guideway for the chain 57a as it moves from the silo wall 11a toward the center area of the silo. The tooth devices 137 have arms 141 which coact with the flange 69a to hold the tooth devices 137 in an upright or digging position during movement thereof toward the center of the silo. As shown in FIG. 12, the tooth devices 137 remain in the upright position during movement of the chain 57a around the sprocket 39a thus carrying silage in an upward direction and forcing it through the opening 76a in the plate 74a into the path of the lateral conveyer 77a.

An idler sprocket 142 (FIG. 12) is rotatably mounted on the shaft 46a and carries an endless link chain 143 which extends around the sprocket 136. The sides of selected links of the chain 143 have upright triangular-shaped flanges 144 secured thereto. Each flange 144 forms a tooth which digs into the silage on the silo wall 11a and silage immediately forward of the chain 57a. The idler sprocket 142 is of a diameter such that the flanges 144 are moved closely adjacent the silo wall 11a so that they act to chip silage that may be attached to the silo wall.

An angle beam 146 (FIGS. 12 and 13) is secured to the flange 69a and extends between the sprockets 136 and 142. The beam 146 provides a guide for the chain 143 which functions to hold the tooth flanges 144 thereof in engagement with the silage as they move from the silo wall 11a to the center of the silo.

In operation, the chain 143 is driven by the drive sprocket 136 and carried closely adjacent the silo wall 11a by idler sprocket 142 which is of a larger diameter than the sprocket 44a. As the chain 143 moves toward the center area of the silo the downwardly projected flanges 144 dig into the silage and break up the silage immediately ahead of the primary chain 57a and tooth devices 137.

The modified silage gathering conveyer 151, shown in FIGS. 15, 16 and 17, has a leveling wheel assembly 152 which is operable to maintain the gathering conveyer in a substantially level or working position as the conveyer walks or moves around the silo. FIGS. 15, 16 and 17 show the outer end section of the conveyer 151 which is similar in construction to the rotary collector 23 of the silo unloader 18 shown in FIGS. 1, 2 and 3. The structure of conveyer 151 which corresponds to structure of the rotary collector 22 is identified with the same reference number provided with a suffix $b$.

The leveling wheel assembly 152 comprises an upright arm 153 secured to the top portion of the outer end of the upright plate 42b by bolts 154. The upper section of the arm 153 angularly projects away from the silo side wall and angularly from the upright plane of the plate 42b toward the wheel 52b. A wheel 156 having a rubber tire is rotatably mounted on the arm 153. The axial position of the wheel 156 on the arm 153 is maintained by a pair of collars 157 and 158, adjustably secured to the arm 153 adjacent opposite sides of the wheel 156.

As shown in FIG. 15, the wheel 156 does not engage the silo side wall 11b when the silage gathering conveyer is in a level position. The distance between the wheel 156 and silo side wall 11b may be varied by adjusting the location of the collars 157 and 158 on the arm 153 or by using a wheel having a larger or smaller diameter.

In use, the balancing weight of the silo unloader may be removed when the leveling wheel 152 is employed to maintain the gathering conveyer 151 in the working position. When the gathering conveyer 151 is in the level or working position the wheel 52b maintains the outer end of the plate 42b spaced from the wall 11b. The moving chain 58b and tooth device 59b forces the wheel 52b into engagement with the silo side wall 11b. When the conveyer 151 falls below a substantially level position, as shown in FIG. 17, the wheel 156 moves into engagement with the wall 11b. As the gathering conveyer 151 walks around the silo, the wheel 156 coacts with the silo side wall 11b to return the conveyer 151 back to the level position. The wheel 156 being rotated in an angular plane with respect to the plane of the top surface of the silage, rides up the silo side wall 11b until the wheel 52b engages the wall 11b.

The silo unloading apparatus 161 shown in FIGS. 18, 19, and 20 is a modification of the unloading apparatus 18 which can be used to evenly distribute or level the cut forage during the filling of the silo. The structure of the unloading apparatus 161 which corresponds to structure of the unloading apparatus 18 is identified with the same reference number provided with a suffix $c$.

The unloading apparatus 161 is pendently suspended by the cable 19c from the top of the silo. The lateral conveyer 24c is disconnected from the silo wall by removing the holding arms and chute. The outer end of the conveyer 24c is held in an elevated position above the top surface of the silage 16c and moves around the silo with the rotary collector 23c.

As shown in FIG. 19, the rotary collector 23c and lateral conveyer 24c project in opposite radial directions. This straight line position of the collector 23c and conveyer 24c is maintained by a frame unit 162 which connects the conveyer pan 84c to the bar 50c.

As illustrated in FIG. 20, the frame unit 162 comprises a sleeve 163 slidably mounted on the bar 50c. A set screw 164 holds the sleeve on the bar. A pair of upwardly extended arms 166 and 167 are secured to the sleeve 163 and are attached at their upper ends by bolts 168 to the sides of the conveyor pan 84c. A plate 169 engages the bottom of the pan 84c and is connected to the arms 166 and 167.

The housing 89c positioned about the inner end section of the chain 77c of the conveyer 24c is connected to the inner end of the collector 23c by downwardly projected arms 171. With this construction the vertical shaft 22c is the sole connection between the transmission casing 28c.

The power transmission unit of the unloading apparatus 161 is held from rotating about the silo by a torque arm 172. As shown in FIG. 19, the inner end of the arm 172 is bifurcated and pivotally connected to opposite sides of the casing 28c by the pin means which connect the strap 33c to the casing 28c. Rotatably mounted on the outer end of the torque arm 172 is a vertical wheel 173 which has a pneumatic rubber tire in engagement with the silo wall. The arm 172 is formed from a pair of telescoping members which are relatively adjustable to vary the effective length of the arm 172. As shown in FIG. 18, the arm 172 projects in an upward and radial direction. As the collector 23c and conveyer 24c move about the silo as a unit, the wheel 173 being in engagement with the silo wall prevents the power transmission unit from turning. A weight 174 mounted on the outer end section of the arm 172 maintains the wheel 173 in engagement with the silo wall.

To distribute the silage adjacent the silo wall 11c, the bottom of the conveyer pan 84c is provided with an opening 176 in registration with the outwardly moving section of the chain conveyor 77c. The hands 98c secured to the chain move the silage along the conveyor pan 84c until it drops through the opening 176. As shown in FIG. 20, a flat door 177 is slidably mounted on track members 178 secured to the bottom of the conveyer pan. The door 177 has a downwardly projected handle 179 which provides a hand grip when it is desired to move the door 177 to its open and closed positions. The door 177 may be provided with latch means (not shown) to hold the door in either its open position (FIG. 20) or its closed position.

In use, the rotary collector 23c is held in engagement with a relatively thin top layer of silage so that it will move around or walk around the silo at a rate of speed just under the speed of rotation of the drive shaft 22c. The moving rotary collector 23c functions as a leveling arm as it evenly distributes silage about the silo. The moving chain 57c and tooth device 59c level the silage in a radial direction and counteract the outward centrifugal action of the rotary collector 23c as it walks around the silo.

The rotary collector 23c moves some silage through the opening 76c into the path of the moving conveyer hands 98c which push this silage to the opening 176 in the conveyer pan 84c. Since the conveyer 24c is coupled to the bar 50c by the frame unit 162 it moves or walks around the silo distributing silage adjacent the silo wall 11c.

The position of the silo unloader 161 is automatically maintained by the winch assembly 21 shown in FIG. 10. When the silo unloader is used to level material placed into the silo the conductor element 131 is adjusted upwardly on the rod 132 so that when part of the weight of the silo unloader has been removed from the cable 19 the compression spring 128 will move the conductor element 131 into engagement with electrical contact 117. This connection will connect the electric motor 106 with the souurce of electrical power. When the motor 106 is energized the worm gear assembly 102 is operated to wind the cable 19c on the drum 103 thereby raising the silo unloader with the resultant increase in load on the compression spring 128. This increased load will compress the spring 128 and move the conductor element 131 out of engagement with the electrical contact 117 thereby breaking the electrical circuit to the motor 106.

In summary, the silo unloader 18 operates in combination with the winch assembly 21 to continuously remove the silage from the silo. The winch assembly 21 controls the vertical position of the silo unloader 18 in response to the weight or force applied to the winch assembly. The resultant effect of this operation is an automatic movement of the rotary collector 23 into engagement with the top of the silage 16 stored in the silo. The rotary collector 23 is lowered with the level of the silage. The endless chain 57 and the tooth devices 59 pivotally connected thereto of the rotary collector remove the silage from the side wall of the silo, carry the silage to the center area of the silo, and elevate the silage into the path of movement of the lateral conveyer 24. The hands 98 of the lateral conveyer 24 move the silage to the spout 99 which directs the silage into the silo chute 13.

While there have been shown, described and pointed out the fundamental novel features of the invention, it is to be understood that various omissions, substitutions, changes in form, and details of the apparatus illustrated may be made by those skilled in the art, without departing from the spirit of the invention. It is intended to be limited only as indicated by the scope of the following claims.

I claim:
1. A bulk material handling apparatus for use in a silo having an upright side wall with a discharge opening section comprising:
   (a) a drive shaft,
   (b) means supporting said drive shaft in an upright position centrally within said silo,
   (c) power means operably connected to said drive shaft for rotating the same,
   (d) a first conveyor means operably connected to said drive shaft for collecting bulk material in the silo and carrying said material to the center area of the silo, said conveyor means having a plurality of tooth means positioned in an upright plane and movable in an endless path to feed the bulk material horizontally to the center area of the silo and to carry the centrally positioned material in an upward direction,
   (e) a second conveyor connected to said drive shaft having one end portion positioned above said first conveyor means and the opposite end thereof positioned at the said discharge opening section in the silo wall, said second conveyor having a plurality of hand means movable in an endless path to feed the bulk material to said discharge opening section, and
   (f) means operably associated with the first conveyer means for guiding the bulk material carried thereby into the one end portion of the second conveyer.

2. A bulky material handling apparatus for use in a silo having upright side walls with a discharge opening section comprising:
   (a) a drive shaft,
   (b) means supporting said drive shaft in an upright position centrally within said silo,
   (c) power means operably connected to said drive shaft for rotating the same,
   (d) a first conveyer means operably connected to said drive shaft, said conveyer means having an arm member extended radially from the center area of the silo to the side wall thereof, a first drive sprocket rotatably mounted on the inner section of said arm member in driven engagement with said drive shaft, a second sprocket rotatably mounted on the outer section of said arm member, an endless chain positioned about said first and second sprockets, a plurality of tooth devices pivotally mounted on said chain, track means secured to said arm and extended radially between said sprockets, said track means having curved end sections which extend around said sprockets, said track means engageable with said tooth devices during movement thereof toward the center area and upwardly of the the silo for holding said tooth devices in a substantial lateral position, (e) a second conveyer means operably connected to said drive shaft having one end portion positioned above said first conveyer means and the opposite end portion thereof extended to said discharge opening section in the silo side wall, an endless chain means extended between said conveyer means end portions to move bulk material toward said discharge opening section, and (f) housing means operably associated with the arm member and coacting with the tooth devices to guide the bulk material carried upwardly by the tooth devices into the second conveyer means.

3. A bulk material handling apparatus for use in a silo having a side wall with a discharge opening section comprising:

(a) an upright drive shaft centrally supported in the silo above the bulk material stored therein, (b) power means operably connected to said drive shaft for rotating the same, (c) laterally disposed first conveyer means for collecting bulk material stored in the silo and carrying said material to the center area of the silo, said conveyer means having a plurality of tooth means positioned in an upright plane and movable in an endless path to carry the bulk material from the side wall to the center area of the silo, (d) power transmission means radially supporting the first conveyer means offset from the center of the silo and connecting the first conveyer means with the drive shaft to drive the first conveyer means to move the bulk material radially inwardly and to move the first conveyer means around the silo by action of said tooth means against the bulk material, and (e) second conveyer means connected to said drive shaft and operable to move the bulk material received from the first conveyer means to the silo discharge section.

4. A bulk material handling apparatus for use in a silo having a discharge opening section comprising:

(a) an upright drive shaft, (b) a power unit for supporting and rotating said drive shaft, (c) means suspending said power unit and drive shaft centrally within said silo, (d) first endless conveyer means movable in an upright plane and extended radially of said drive shaft for collecting bulk material stored in the silo and carrying said material to the center area of the silo, (e) power transmission means radially supporting the first conveyor means offset from the center of the silo and rotatably connecting the first conveyer means with the drive shaft whereby movement of said first conveyor means simultaneously moves bulk material to the center area of the silo and creates a torque to walk the first conveyer means around the silo, and (f) second conveyer means connected to said drive shaft above said first conveyer means and operable to move the bulk material discharged by the first conveyor means to said silo discharge opening section.

5. A bulk material handling apparatus for leveling and distributing silage placed in a silo having a side wall comprising:

(a) an upright drive shaft, (b) a power unit for supporting and rotating said drive shaft, (c) means suspending said power unit and drive shaft centrally within said silo, (d) torque arm means operably connected to said power unit and engageable with a portion of said silo operative to prevent turning movement of said power unit about a vertical axis, (e) first conveyer means extended radially of said drive shaft for collecting bulk material stored in the silo and carrying said material to the center area of the silo, (f) power transmission means radially supporting the first conveyer means offset from the center of the silo and connecting the first conveyer means with the drive shaft for orbital movement in an upright plane whereby movement of said first conveyer means produces a circumferential torque about the central drive shaft to move the first conveyer means around the silo.

References Cited by the Examiner

UNITED STATES PATENTS

| | | | |
|---|---|---|---|
| 2,430,203 | 11/1947 | Bailey | 214—17.84 |
| 2,435,334 | 2/1948 | Wurtele | 198—162 |
| 2,678,241 | 5/1954 | Miller. | |
| 2,735,533 | 2/1956 | Collins et al. | 198—162 |
| 2,955,719 | 11/1960 | Hilderbrand. | |
| 2,988,238 | 6/1961 | Bruecker. | |
| 3,023,917 | 3/1962 | Patz et al. | 214—17.84 |
| 3,063,581 | 11/1962 | Bruecker | 214—17.84 |
| 3,071,263 | 1/1963 | Bruecker | 214—17.84 |
| 3,079,016 | 2/1963 | Dretzke | 214—17.84 |

FOREIGN PATENTS 548,455   10/1942   Great Britain.

GERALD M. FORLENZA, *Primary Examiner.*

HUGO G. SCHULZ, *Examiner.*